United States Patent Office 2,910,467
Patented Oct. 27, 1959

2,910,467

STARCH CROSS-LINKED WITH HEXAHYDRO-1,3,5-TRIACRYLOYL-s-TRIAZINE

Ernest L. Wimmer, Elm Grove, Wis., assignor to Chas. A. Krause Milling Co., Milwaukee, Wis., a corporation of Wisconsin No Drawing. Application January 18, 1956
Serial No. 559,788

5 Claims. (Cl. 260—233.3)

This invention relates to improvements in potential adhesive product of improved cohesiveness and method of manufacturing the same.

It is a general object of the present invention to provide a product as above described which has, in addition to its improved cohesiveness, extreme resistance to shear, heat or high alkalinity, and which may, if desired, be made to possess very high viscosity, it being possible to obtain a selected viscosity to suit a particular purpose. The invention is particularly suitable for use in producing industrial adhesives and binders.

A further object of the invention is to provide, as one form of the invention, a potential adhesive product of such a nature that when the pastes have been dried, the resultant material is less soluble in water and, therefore, more weather resistant than materials obtained using pastes prepared from starch or flour by the use of conventional methods.

A further object of the invention is to provide a potential adhesive product by inducing a cross-linked structure between starch molecules or within the component molecules of starch-bearing materials such as cereal and tuber flours.

A more specific object of the invention is to provide a method as above described wherein the cross-linking of the starch or starch-bearing materials is accomplished by the use of the reagent hexahydro-1,3,5-triacryloyl-s-triazine, preferably in the presence of an alkaline catalyst.

With the above and other objects in view the invention consists of the improved potential adhesive product of improved cohesiveness and method of manufacturing the same and all of its parts and combinations, as set forth in the claims, and all equivalents thereof.

The cross-linked structure between component molecules of starches or starch-bearing materials is preferably induced by reacting same with an aqueous solution of hexahydro-1,3,5-triacryloyl-s-triazine at elevated pH values.

In all probability the hydroxyl groups of the starch or flour or other reactive groups containing reactive hydrogen such as amino, sulfhydryl, carboxyl, etc. of the protein constituents of the flours, adds to the unsaturated linkages of the cross-linking agent to produce a three dimensional polymer as indicated in the following where the material such as starch containing many alcoholic hydroxyls is represented by $R(OH)_x$.

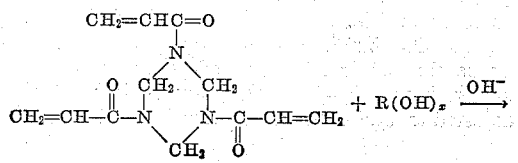

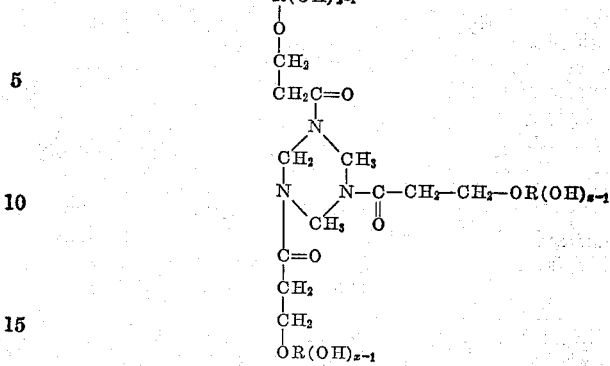

Other constituent hydroxyl groups or active hydrogen atoms are then subject to further cross-linking.

The above representation is merely a hypothesis and its validity should not be construed as an essential part of this invention.

The present invention is represented by carrying out the reaction between the several reagents within the range of conditions outlined below and is revealed in the modification of physical properties of the starch or starch-bearing material particularly in regard to viscosity of the gelatinized or dispersed solutions, degree of solubility and resistance of the dispersions to such forces as mechanical shear, heat and alkali, and in the reduction of solubility in water of films prepared by drying such dispersions.

*Material to be cross-linked.*—Cereal and tuber starches such as corn, wheat, sorghum, rye and potato, are readily cross-linked by the reagent. In addition unrefined or partially refined flours from these grains or tubers are also readily cross-linked by the procedure of the present invention. Of particular value is the utilization of degerminated corn flour; however, other flours such as wheat, sorghum, or rye are equally applicable. The reaction is not believed to be limited to the starch component of the flour, but the protein and other constituents containing groups possessing so-called active hydrogen atoms such as carboxyl, amino, sulfhydryl, phenolic, may react. Thus, protein constituents of flours may be cross-linked by the reagent to yield flours containing cross-linked protein fractions.

Also included within the scope of the invention is the cross-linking of certain modified starches or flours such as roasted and acid produced dextrins and flours and certain chemically modified starches or flours such as carboxymethyl, carboxyethyl, hydroxyethyl, sulfated and sulfonated starches and cationic type modified starches and flours containing amino groups.

*The cross-linking reagent.*—Hexahydro-1,3,5-triacryloyl-s-triazine is a white, crystalline water-soluble monomer which is described in U.S. Patent No. 2,559,835, Example 8.

*Temperature.*—The rate of the reaction is a function of the temperature in a normal manner, i.e., the rate is accelerated by increased temperature. Satisfactory products have been produced at ambient temperatures, but several hours are required for completion of the reaction. The reaction is almost instantaneous at temperatures of 80°–100° C. if sufficient alkali is present. Thus, reaction temperature and alkali concentration are rather interdependent in regard to rate of reaction.

*Alkali.*—As previously indicated, the reaction I have described is best accomplished with an alkaline reaction, and the alkali may be considered as a catalyst for the reaction. Although cross-linking may be accomplished at a pH as low as 8.0, it is preferred to operate in the range of pH 9.5–12.5 to obtain the greatest efficiency. Higher alkalinities are also applicable, but they are accompanied by a simultaneous dissociation of hydrophilic polymers, particularly starch. In such case reduced viscosities are obtained but the molecular structure in dispersion is extremely resistant to mechanical stresses.

Sodium hydroxide is the most economical alkali; however, such other sources of alkalinity as potassium hydroxide and calcium hydroxide as well as sodium and potassium salts which hydrolyze to their hydroxides such as the carbonates, phosphates, sulfides, silicates and borates are also applicable.

*Ratio of ingredients.*—Minute amounts of the cross-linking agent are able to induce changes in the physical properties of the starch or flour which is reacted with it according to the present invention. For most uses it is preferred to have the cross-linking agent represent less than 2% of the starch or flour; however, applications which require an extremely water insoluble film or tough gel may require as much as 5–10% of cross-linking agent in relation to the starch or flour.

*Manner of carrying out the reaction.*—Starches and starch in cereal flours exist in a granular physical state which is rather insoluble in water and contributes in a relatively insignificant manner to the viscosity of aqueous suspensions. When aqueous suspensions are heated, a temperature (gelatinization or gel point) is reached at which the granule rapidly imbibes water, swells to yield a viscous dispersion and finally with increased heat or shear yields a fluid colloidal dispersion of starch. The process is known as gelatinization. Most applications of starch rely upon its properties in the gelatinized or dispersed state.

There are several ways in which the cross-linking reaction may be carried out, and these will be illustrated with specific examples.

In the first example, the raw starch or flour may be slurried with the catalytic amount of alkali in aqueous suspension at a temperature below the gelatinization temperature until the reaction is complete. Then it may be filtered, washed and dried without disrupting the granule structure of the starch. This is referred to as cross-linking within the granule.

*Example 1.*—30 parts of corn starch is slurried in 100 parts of water containing sufficient NaOH to yield a pH of 11.5. Then 0.015 part of hexahydro-1,3,5-triacryloyl-s-triazine is added and the temperature raised to 55° C. After 15 minutes the slurry is filtered, washed and dried in an air oven at 60° C. 6.25 parts of the product is then slurried in 100 parts of water and held at the temperature of a boiling water bath for a predetermined time. When thus held for 60 minutes the viscosity was 2400 cps. (Brookfield synchroelectric viscometer). Untreated starch pasted in this manner yielded a viscosity of 1350 cps.

When the starch or flour is cross-linked in the manner prescribed above and then subsequently gelatinized in water, increasing viscosities are obtained with increasing ratio of cross-linking reagent to raw starch or flour. Concurrently, however, the granule becomes more resistant to penetration by water molecules and more resistant to gelatinization requiring higher heats and longer heating times to swell and disorganize the granule. This is a case hardening effect.

*Example 2.*—The procedure of Example 1 is followed, using, however, 0.06 part of hexahydro-1,3,5-triacryloyl-s-triazine. Paste prepared with the product, as illustrated in Example 1, yielded the following viscosities after 30 minutes, 60 minutes, and 90 minutes in its boiling bath: 10 cps., 30 cps., 700 cps., with the starch cross-linked to a very high degree.

Thus, the amount of cross-linking reagent may be varied to yield the desired viscosity of gel without unduly "case hardening" the granules of starch in raw starch or flour. With high degree of cross-linking, a product can be obtained which will not swell or disperse in water under normal conditions of gelatinization.

Alternatively the flour or starch may be cross-linked in the manner prescribed above, however, in lieu of washing and filtering and drying the commodity for shipment and subsequent gelatinization, it may be gelatinized immediately by application of heat to the alkaline aqueous suspension, or the alkali may be neutralized with acid such as hydrochloric acid before gelatinization.

*Example 3.*—Twenty-five parts of degerminated corn flour may be suspended in 395 parts of water containing 0.6 part of NaOH and 0.025 part hexahydro-1,3,5-triacryloyl-s-triazine. The suspension may be held at 55° for 15 minutes and then the alkali neutralized with 6 N HCl (2.5 parts). The suspension may then be pasted directly in a boiling water bath for 60 minutes to obtain a viscosity of 3770 cps. as compared with a viscosity of 618 cps. in a corn flour paste prepared in a similar manner without the addition of cross-linking reagent.

Alternatively the starch or flour may be removed from the reaction medium by filtration, centrifugation or sedimentation, suspended in fresh water and gelatinized by heating.

In certain applications it has been found advantageous to cross-link and gelatinize the flour or starch simultaneously. Thus the suspension of starch or flour in water containing the cross-linking agent and catalyst may be heated immediately to gelatinization temperature to yield viscous cohesive pastes.

*Example 4.*—Sixteen parts of degerminated corn flour may be slurried in 385 parts water containing 0.08 part of hexahydro-1,3,5-triacryloyl-s-triazine and sufficient caustic soda to yield a pH of 11.2. The slurry may be immediately pasted in a boiling water bath and the temperature maintained at 95° C. for 15 minutes, the flour being gelatinized and cross-linked simultaneously to obtain a viscosity of 735 cps. at 75° C. whereas a flour treated in a similar manner but without the addition of cross-linking agent yields a paste with a viscosity of 510 cps. at 75°.

As another variation of the process, the starch or flour may be gelatinized by heating in aqueous medium either in the presence or absence of alkali; then after adjustment of the reaction to the proper alkalinity and the addition of the cross-linking reagent a viscous mass possessing the characteristic physical properties is obtained. Treatment of this type eliminates the "case hardening" effect of cross-linked granules.

*Example 5.*—Sixteen parts of corn flour may be slurried in 395 parts water containing sodium hydroxide to yield pH of 11.4. The slurry may be gelatinized by heating with stirring at boiling bath temperature for 15 minutes. Then a solution of 0.32 part hexahydro-1,3,5-triacryloyl-s-triazine is added with rapid agitation. After 10 minutes the viscosity of the paste at 75° C. is 1500 cps.

Products which have been cross-linked by our process and which are in a gelatinized aqueous dispersion may, of course, be subsequently dried and marketed as pregelatinized cross-linked starches or flours. Thus the aqueous dispersion may be dried on steam heated drums as a film or spray dried.

It has also been found feasible to prepare an aqueous suspension of starch or flour, containing the cross-linking agent and alkali in solution and to simultaneously carry out the reaction, gelatinize the product and dry it in one step by passage of the suspension over the usual rotating steam heated drum driers.

*Example 6.*—One hundred parts of degerminated corn flour may be slurried in 250 parts of water containing 0.05 part of hexahydro-1,3,5-triacryloyl-s-triazine and the pH adjusted to 11.5 with 4 N sodium hydroxide solution. The slurry is then passed over a steam heated drum drier operated at a steam pressure of 80 p.s.i. The dried product swells slowly in cold water to yield a cohesive gel extremely resistant to mechanical shear.

Although Example 6 illustrates the method of carrying out the novel reaction wherein the slurry of starchy material in alkaline water containing dissolved cross-linking reagent is gelatinized, cross-linked and dried simultaneously to a film on hot metallic rolls to produce a marketable product, Example 7 is a specialized process wherein the film so produced is prepared by simultaneously gelatinizing, cross-linking and drying between layers or elements of a material to be bonded, i.e., laminated paper board, corrugated paper board, plywood structures, etc. The bond produced in this manner is waterproof or water-resistant depending upon the ratio of cross-linking reagent to starch-bearing material.

*Example 7.*—Two pounds of corn starch is slurried in one gallon of water and 0.09 lb. of caustic soda dissolved in 0.03 gal. of water is added. The slurry is heated to 170° F. and cooked 15 min. at this temperature. Then 1 gal. of cold water is added and this dispersion is added to a slurry of 15 lbs. of corn starch, slurried in 4 gallons of water and containing 0.15 lb. of hexahydro-1,3,5-triacryloyl-s-triazine. The cooked constituent acts as a suspending agent for the raw starch. The resultant smooth-bodied slurry is a potential water resistant adhesive e.g. when applied to the flutes of a corrugated paper medium to which a paper liner is then pressed and heat is applied, the raw starch is gelatinized, cross-linked and dried simultaneously to yield a water resistant bond valuable in the production of water-resistant corrugated paper board. While in this example the reagent represents approximately 1% of the starch, this percentage may go as high as 5–10%, depending upon the amount of water resistance desired in the finished corrugated board.

In a related manner to Example 6, degerminated corn grits may be tempered with water in the presence of the cross-linking agent and catalyst to a relatively high moisture content; then by passage between high temperature, gas fired rolls, the grid is converted to a dried flake which is composed of pregelatinized and cross-linked starch.

*Example 8.*—One hundred parts of degerminated corn grits are sprayed with 10 parts of an aqueous solution composed of 1% hexahydro-1,3,5-triacryloyl-s-triazine and 5% sodium hydroxide. Live steam is introduced and the mixture is heated to about 130° F.; then it is held to allow the moisture to equilibrate throughout the grits. The tempered grits are then cooked with live steam to about 200° F. and finally passed between steel rolls which have been heated to 400° F. with a gas flame. The product is a dried, pregelatinized flake which swells in cold water to yield a cohesive gel.

While the above products and processes of making the same constitute preferred embodiments of the invention, changes may be made without departing from the scope of the invention as defined in the appended claims.

What I claim is:

1. A starch product consisting of starch cross-linked with hexahydro-1,3,5-triacryloyl-s-triazine, the latter being in an amount less than 10% of the starch by weight.

2. A starch product consisting of flour containing starch cross-linked with hexahydro-1,3,5-triacryloyl-s-triazine, the latter being in an amount less than 10% of the starch by weight.

3. A starch product consisting of starch cross-linked with hexahydro-1,3,5-triacryloyl-s-triazine, the latter being less than 2% of the starch.

4. A starch product consisting of gelatinized starch cross-linked with hexahydro-1,3,5-triacryloyl-s-triazine, the latter being in an amount less than 10% of the starch by weight.

5. A starch product consisting of gelatinized flour containing starch cross-linked with hexahydro-1,3,5-triacryloyl-s-triazine, the latter being in an amount less than 10% of the starch by weight.

References Cited in the file of this patent

UNITED STATES PATENTS

| | | |
|---|---|---|
| 2,524,400 | Schoene et al. | Oct. 3, 1950 |
| 2,615,889 | Zerner et al. | Oct. 28, 1952 |